(12) United States Patent
Vogt et al.

(10) Patent No.: US 12,486,221 B2
(45) Date of Patent: Dec. 2, 2025

(54) PREPARATION OF SUBSTITUTED 4-(N'-HYDROXYCARBAMIMIDOYL)BENZOIC ACIDS

(71) Applicant: BASF SE, Ludwigshafen (DE)

(72) Inventors: Florian Vogt, Ludwigshafen (DE); Kailaskumar Borate, Navi Mumbai (IN); Bernd Wolf, Ludwigshafen (DE); Joachim Gebhardt, Ludwigshafen (DE); Guillaume Michel Jacques Garivet, Ludwigshafen (DE); Harish Shinde, Navi Mumbai (IN); Roland Goetz, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 422 days.

(21) Appl. No.: 17/925,873

(22) PCT Filed: May 20, 2021

(86) PCT No.: PCT/EP2021/063439
§ 371 (c)(1),
(2) Date: Nov. 17, 2022

(87) PCT Pub. No.: WO2021/239568
PCT Pub. Date: Dec. 2, 2021

(65) Prior Publication Data
US 2023/0183171 A1 Jun. 15, 2023

(30) Foreign Application Priority Data

May 29, 2020 (IN) .............................. 202021022648
Jul. 14, 2020 (EP) .................................... 20185642

(51) Int. Cl.
*C07D 271/06* (2006.01)
*C07C 259/18* (2006.01)
*C12P 13/00* (2006.01)

(52) U.S. Cl.
CPC .......... *C07C 259/18* (2013.01); *C07D 271/06* (2013.01); *C12P 13/002* (2013.01)

(58) Field of Classification Search
CPC .................................................. C07D 271/06
See application file for complete search history.

(56) References Cited

FOREIGN PATENT DOCUMENTS

| CN | 107641622 A | 1/2018 |
| WO | WO-2013/008162 A1 | 1/2013 |
| WO | WO-2015/185485 A1 | 12/2015 |
| WO | WO-2016/097004 A1 | 6/2016 |
| WO | WO-2017/211649 A1 | 12/2017 |
| WO | WO-2020/152104 A2 | 7/2020 |

OTHER PUBLICATIONS

Crosby, et al., "Regioselective hydrolysis of aromatic dinitriles using a whole cell catalyst", Journal of the Chemical Society, Perkin Transactions 1, vol. 1, Issue 13, Jan. 1, 1994, pp. 1679-1687.
European Search Report for EP Patent Application No. 20185642.4, Issued on Nov. 18, 2020, 4 pages.
Kitamura, et al., "Orally active GPllb/IIIa antagonists: synthesis and biological activities of masked amidines as prodrugs of 2-[(3S)-4-[(2S)-2-(4-amidinobenzoylamino)-3-(4-methoxyphenyl)propanoyl]-3-(2-methoxy-2-oxoethyl)-2-oxopiperazinyl] acetic acid", Chemical and pharmaceutical bulletin, vol. 49, Issue 3, 2001, pp. 268-277.
Meth-Cohn, et al., "Regioselective biotransformations of dinitriles using *Rhodococcus* sp. AJ2701", Journal of the Chemical Society, Perkin Transactions 1, Issue 21, Jan. 1, 1997, pp. 3197-3204.
International Patent Application No. PCT/EP2021/063439, International Search Report and Written Opinion, mailed Jun. 29, 2021.

*Primary Examiner* — John S Kenyon
(74) *Attorney, Agent, or Firm* — MARSHALL, GERSTEIN & BORUN LLP

(57) ABSTRACT

The present invention relates to a process for the preparation of substituted 4-(N'-hydroxy-carbamimidoyl)benzoic acids, which can be obtained by nitrilase catalyzed hydration of substituted terephthalonitriles of formula (II) in an aqueous medium to afford (ammonium) 4-cyanobenzoic acids (IIa). The hydration is followed by treatment of the aqueous reaction medium with hydroxylamine or a salt thereof to afford amidoximes (I).

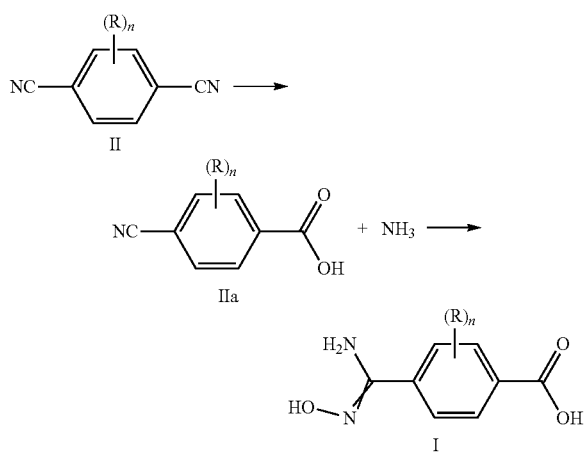

14 Claims, No Drawings

PREPARATION OF SUBSTITUTED 4-(N'-HYDROXYCARBAMIMIDOYL)BENZOIC ACIDS

CROSS-REFERENCE TO RELATED APPLICATIONS

This is the U.S. national phase of International Application No. PCT/EP2021/063439, filed May 20, 2021, which claims the benefit of Indian Patent Application number 202021022648, filed on May 29, 2020, and European Patent Application No. 20185642.4, filed Jul. 14, 2020.

The present invention relates to a process for the preparation of substituted 4-(N'-hydroxy-carbamimidoyl)benzoic acids, which can be obtained by nitrilase catalyzed hydration of substituted terephthalonitriles of formula II in an aqueous medium to afford (ammonium) 4-cyanobenzoic acids IIa. The hydration is followed by treatment of the aqueous reaction medium with hydroxylamine or a salt thereof to afford amidoximes I.

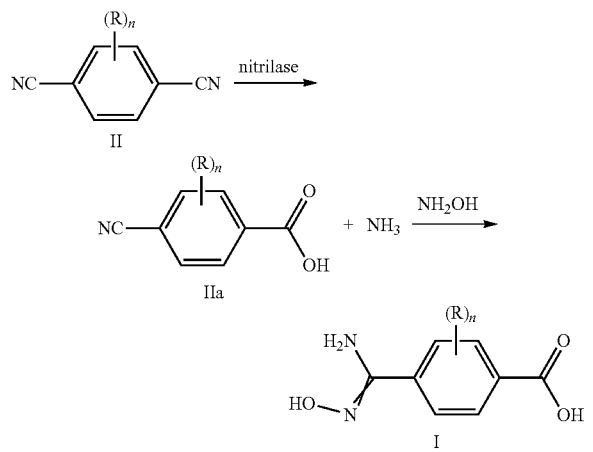

4-(N'-hydroxy-carbamimidoyl)benzoic acids are herein also referred to as amidoximes of formula I. Amidoximes I are versatile synthetic intermediates. For example, compounds of formula I may be used as precursors in the preparation of known benzamide type trifluoromethyl-1,2,4-oxadiazoles, for example compounds disclosed in WO 2015/185485 and WO 2017/211649, which are useful for controlling phytopathogenic fungi.

It is known that amidoximes I can be obtained from 4-cyanobenzoic acids IIa by treatment with hydroxylamine or a salt thereof in the presence of an auxiliary base and in a suitable solvent such as, for example, methanol, ethanol, or water, or a mixture of these solvents. For related examples see Kitamura, S. et al Chem. Pharm. Bull. 2001, 49, 268.

The synthesis of 4-(N'-hydroxy-carbamimidoyl)benzoic acid was described in WO 2017/211649 and in WO 2013/008162, where the authors reacted 4-cyanobenzoic acid and hydroxylamine hydrochloride in a mixture of water and ethanol in the presence of potassium carbonate and substoichiometric amounts of 8-hydroxyquinoline at reflux conditions.

Chemical reactions starting from technical 4-cyanobenzoic acid IIa require the presence of a base to provide appreciable yields of amidoximes I. The base could be an auxiliary base or an excess of hydroxylamine. However, the use of hydroxylamine is not efficient from an economical point of view due to its comparatively high price.

The inventors of the present invention surprisingly found that the formation of amidoximes of formula I proceeds in high overall yields and purities by addition of hydroxylamine to an aqueous medium that is directly obtained from a biocatalytic, mono-hydration of terephthalonitriles of formula II, wherein the hydration is catalyzed by nitrilase. This highly efficient two-step process establishes a particularly advantageous access to amidoximes I on an industrial scale, because it does not require the addition of solvents or auxiliary bases together with the hydroxylamine in the addition step. Moreover, a cumbersome isolation of the intermediate (ammonium) 4-cyanobenzoic acids IIa is not necessary.

Accordingly, the present invention relates to a process for preparing amidoxime compounds of formula I,

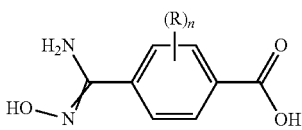

wherein
R is halogen, $C_1$-$C_4$-alkyl, $C_1$-$C_4$-haloalkyl, $C_1$-$C_4$-alkoxy, or $C_1$-$C_4$-haloalkoxy;
n is 0, 1 or 2;
the process comprising the steps of
i. providing an aqueous medium comprising water, one or more nitrilase, and terephthalonitrile of formula II, wherein the variables n and R have the meaning as defined for compound of formula I,

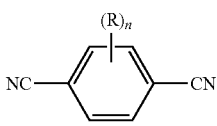

ii. incubating the aqueous medium to obtain 4-cyanobenzoic acid of formula IIa or a salt thereof in an aqueous medium, wherein the variables n and R in of 4-cyanobenzoic acid IIa have the meaning as defined for compound of formula I,

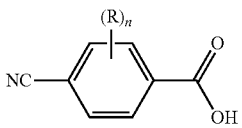

iii. removal of the biological material from the aqueous medium;
iv. treatment of the aqueous medium obtained in step iii with hydroxylamine or a salt thereof.

Nitrilases are a class of enzymes that catalyze the hydration of a nitrile to yield a carboxylic acid. Various nitrilase-producing organisms, including bacteria, filamentous fungi, yeasts, and plants were described and some of these microbial cell factories were utilized for the commercial production of carboxylic acids in industrial scale. Enzymatic hydration of nitriles to produce carboxylic acids can be achieved either by a nitrilase or through a biocatalytic cascade involving a nitrile hydratase followed by an amidase.

The selective enzymatic hydration of terephthalonitrile to produce ammonium 4-cyanobenzoic acid was described in the prior art. PCT/EP2020/051288 provides an overview of the prior art and particularly efficient conditions for the selective mono-hydration of terephthalonitrile by nitrilases. The content of PCT/EP2020/051288 shall be deemed as incorporated by reference to supplement the disclosure of the present invention.

In one embodiment of the invention process steps i and ii correspond to the process for producing 4-cyanobenzoic acid or a salt thereof as defined or preferably defined in PCT/EP2020/051288 and the nitrilase in step i and ii is comprising a sequence as defined or preferably defined in PCT/EP2020/051288, preferably those referred to in claim 7 or 8, particularly those identified in table 1 on page 4.

The nitrilase used in the process of the invention may be isolated from the organism naturally expressing said nitrilase. Alternatively, the nitrilase may be added to the aqueous medium by adding cells comprising said nitrilase or by adding a suspension comprising inactivated, for example disrupted cells. In another embodiment of the invention, the nitrilase may be produced in recombinant organisms, preferably microorganisms, expressing the nitrilase of the invention from a heterologous construct. The nitrilase so produced may be isolated from the recombinant organism and added to the aqueous medium or the nitrilase may be added by inactivating, for example disrupting the cells and adding the suspension.

The cells or suspension comprising inactivated cells may be at least partially concentrated for example by drying before being added to the aqueous medium used in the methods of the invention or to the composition of the invention.

The nitrilase may be (partly) immobilized for instance entrapped in a gel or it may be used for example as a free cell suspension. For immobilization well known standard methods can be applied like for example entrapment cross linkage such as glutaraldehyde-polyethyleneimine (GA-PEI) crosslinking, cross linking to a matrix and/or carrier binding etc., including variations and/or combinations of the afore-mentioned methods. Alternatively, the nitrilase enzyme may be extracted and for instance may be used directly in the process for preparing the ammonium salt or the acid. When using inactivated or partly inactivated cells, such cells may be inactivated by thermal or chemical treatment.

The aqueous medium in process steps i to iv may be a solution or a suspension or a solution and a suspension, wherein any of the substances comprised in said aqueous medium may be fully or partially dissolved and/or partially or fully suspended.

In one embodiment the aqueous medium in process steps i and ii has a pH value of 4 to 9. In a preferred embodiment the aqueous medium in process steps i and ii has a pH value of 6 to 9. In another preferred embodiment the aqueous medium in process steps i and ii has a pH value of 6.5 to 8. In still another preferred embodiment the aqueous medium in process steps i and ii has a pH value of 6.8 to 7.5. In a preferred embodiment the aqueous medium in process steps i and ii has a pH value of 6.8 to 7.2.

If the process is conducted at pH values above 7 an aqueous solution of a base, for example an alkali metal hydroxide such as sodium or potassium hydroxide or an alkaline earth metal hydroxide, may be added to the aqueous medium to maintain the pH above 7. Alternatively, a suitable buffer system can be used to maintain a certain pH range, for example a phosphate buffer, particularly a potassium phosphate buffer.

The aqueous medium in process step i may further comprise a divalent cation, for example $Mg^{2+}$, $Mn^{2+}$, $Ca^{2+}$, $Fe^{2+}$, $Zn^{2+}$ or $Co^{2+}$. Preferably the divalent cation is $Mg^{2+}$ or $Mn^{2+}$, most preferably, the divalent cation is $Mg^{2+}$. The divalent cation may have a concentration of 1 mM to 500 mM, for example 10 mM to 450 mM. Preferably the concentration of the divalent cation is between 20 mM and 400 mM, preferably between 30 mM and 300 mM, more preferably between 40 mM and 250 mM, more preferably between 40 mM and 200 mM, most preferably between 40 mM and 150 mM.

In a preferred embodiment the incubation step ii is performed at a temperature in the range of from 10° C. to 50° C., preferably from 15° C. to 40° C., more preferably from 20° C. to 40° C., even more preferably from 24° C. to 37° C., even more preferably from 28° C. to 36° C., even more preferably from 29° C. to 34° C., most preferably from 30° C. to 33° C.

In a preferred embodiment, the incubation step ii is performed for 30 minutes to 48 hours, preferably for 1 hour to 36 hours, more preferably for 2 hours to 24 hours, most preferably for 3 hours to 15 hours.

At the start of the incubation step ii the aqueous medium comprises at least 0.05% terephthalonitrile, preferably at least 0.1% terephthalonitrile, more preferably at least 0.5% terephthalonitrile, most preferably at least 1.0% terephthalonitrile (w/w). Throughout the incubation the concentration of terephthalonitrile may be kept at a concentration of about 0.5% to 1.5%, preferably about 1.0% terephthalonitrile by continuous feeding of terephthalonitrile. Alternatively, the concentration of terephthalonitrile in the aqueous medium may be between 1 wt % to 30 wt % at the start of the incubation, preferably between including 5 wt % to 10 wt %, even more preferably between including 6 wt % to 9 wt %, most preferably between including 7 wt % to 8.5 wt %.

After the biocatalytic transformation in step ii is completed, the biological constituents are removed from the aqueous medium. This is achieved, for example, by standard filtration methods such as ultra-filtration. The 4-cyanobenzoic acids IIa obtained in step ii may have a tendency to precipitate, which might cause loss of the desired material upon removal of the biological material in step iii.

In one embodiment of the invention, in order to prevent precipitation of benzoic acid IIa, the pH value of the aqueous medium is raised to 8-10, preferably 8.5-9, for example by adding a suitable base such as an aqueous solution of sodium or potassium hydroxide to the aqueous medium obtained after completion of step ii and prior to the filtration step iii.

Typically, the process step iv is conducted with hydroxylamine or its salts formed with hydrochloric acid or sulfuric acid; particularly with hydroxylamine as a free base. In one aspect, an aqueous solution of hydroxylamine or its salt is added to the aqueous medium obtained in step iii.

In one embodiment process step iv is conducted using 1 to 3 molar equivalents of hydroxylamine or a salt thereof, based on the amount of the terephthalonitrile II. Preferably, 1 to 2 molar equivalents are used, more preferably 1 to 1.5 equivalents, particularly 1 to 1.3 molar equivalents are used, based on the amount of the terephthalonitrile II.

The reaction temperature of process step iv is in the range of from 0° C. to 100° C.; preferably in the range of from 10° C. to 80° C.; more preferably in the range of from 20° C. to 50° C.

The process step iv is generally carried out within 1 to 12 hours, preferably within 2 to 8 hours.

The process step iv is typically carried out at atmospheric pressure.

In one embodiment of the invention no auxiliary base is added to the aqueous medium obtained in step iii so that the pH value of the aqueous medium in step iv of the process corresponds to the pH of the aqueous medium obtained after step iii.

In another embodiment the process step iv is carried out in the presence of an auxiliary base, which can be an inorganic or an organic base. Examples for preferred inorganic bases are alkali metal and alkaline earth metal carbonates, hydroxides, and phosphates. Preferred alkali metal carbonates are sodium and potassium carbonate, particularly sodium carbonate. Preferred alkaline earth metal carbonates are magnesium and calcium carbonates. Preferred alkali metal hydroxides are sodium and potassium hydroxide, particularly sodium hydroxide. Preferred alkaline earth metal carbonates are magnesium and calcium hydroxide. Preferred alkali metal phosphates are trisodium phosphate ($Na_3PO_4$) and disodium phosphate ($Na_2HPO_4$).

In another aspect the base is an organic base such as tri-(C1-C6)-alkylamines or an N-heteroaromat. Examples for tri-(C1-C6)-alkylamines are, for example, trimethylamine, triethylamine, tripropylamine, tributylamine, trihexylamine, trioctylamine, tridecylamine, N,N-dimethylethylamine, dimethylpropylamine; aromatic amines such as dimethylaniline or tribenzylamine; cyclic amines such as N-methylpyrrolidine, N-methylpiperidine, N-methylmorpholine, N,N'-dimethylpiperazine.

Also suitable are N-heteroaromatic bases such as pyridine, imidazole, N-methylimidazole or quinoline. Examples of suitable substituted pyridines are collidine, lutidines, 2-picoline, 3-picoline, 4-picoline, N,N-dimethyl-4-aminopyridine, 5-ethyl-2-methyl-pyridine.

Further suitable bases are 1,5,7-triazabicyclo[4.4.0]dec-5-ene (TBD), and 1,8-diazabicyclo[5.4.0]undec-7-ene (DBU).

In one embodiment the process of the present invention is carried out in the presence of a base, which is selected from the group consisting of alkali metal $C_1$-$C_6$-alkoxides, alkali and earth alkali metal carbonates, alkali and earth alkali metal hydroxides, tri-($C_1$-$C_6$)-alkylamines, pyridine, N-methylimidazole or quinoline, pyridine, collidine, lutidine, 2-picoline, 3-picoline, 4-picoline, N,N-dimethyl-4-aminopyridine, 5-ethyl-2-methyl-pyridine, DBU and TBD.

In one aspect the base is selected from the group consisting of alkali metal $C_1$-$C_6$-alkoxides; particularly sodium methoxide or sodium ethoxide.

The auxiliary base is used in an amount of at least 80 mol % based on the amount of terephthalonitrile II, or at least 100 mol %, or at least 150 mol %. In another aspect of the present invention the base is used in an amount that ranges between 80 and 1000 mol % based on the amount of terephthalonitrile II. In a further aspect of the present invention the base is used in an amount that ranges between 80 and 500 mol % based on the amount of terephthalonitrile II. In yet another aspect the base is used in an amount that ranges between 90 and 200 mol % based on the amount of terephthalonitrile II.

After completion of the reaction in step iv the following work-up procedure allows the isolation of amidoximes I: the reaction medium is cooled to ambient temperature and the pH is adjusted to below pH 5. Water is optionally added to the reaction medium to ensure stirring of the suspension. Upon cooling of the suspension, the solid amidoxime I is collected via filtration.

In a preferred embodiment the variable n is 0.

In one preferred aspect of the present invention the variable n is 1 and R is methyl, trifluromethyl, fluorine, or chlorine.

In one aspect n is 1 and R is fluorine.

In one embodiment of the process of the present invention the compound of formula I is further reacted with an activated derivative of trifluoroacetic acid, for example trifluoroacetic anhydride or trifluoroacetic chloride, to obtain a compound of formula III

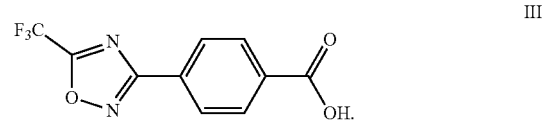 [SMILES: O=C(O)c1ccc(-c2noc(C(F)(F)F)n2)cc1]

These transformations are described in Kitamura, S. et al Chem. Pharm. Bull. 2001, 49, 268, WO 2013/008162, WO 2015/185485, WO 2017/211652, or WO 2019/020451, and in the references cited therein.

In one embodiment the process of the present invention further comprises the step of reacting the compound of formula III to obtain a compound of formula IV,

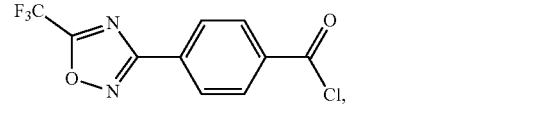

as described in WO 2017/211652 or WO 2019/020451 and in the references cited therein.

In one embodiment the process of the present invention further comprises the step of reacting the compound of formula III or IV with an amine of formula V,

wherein $R^1$ is $C_1$-$C_6$-alkyl, $C_1$-$C_6$-alkoxy, $C_3$-$C_{11}$-cycloalkyl, $C_3$-$C_6$-cycloalkenyl, $C_2$-$C_6$-alkenyl, $C_2$-$C_6$-alkynyl, $C_1$-$C_6$-alkoxyimino-$C_1$-$C_4$-alkyl, $C_2$-$C_6$-alkenyloxyimino-$C_1$-$C_4$-alkyl, $C_2$-$C_6$-alkynyloxyimino-$C_1$-$C_4$-alkyl, $C_1$-$C_6$-alkylamino, di$C_1$-$C_6$-alkylamino, —C(=O)—$C_1$-$C_6$-alkyl, —C(=O)—O—$C_1$-$C_6$-alkyl, phenyl-$C_1$-$C_4$-alkyl, phenyl-$C_1$-$C_4$-alkenyl, phenyl-$C_1$-$C_4$-alkynyl, heteroaryl-$C_1$-$C_4$-alkyl, phenyl, naphthyl, or a 3- to 10-membered saturated, partially unsaturated or aromatic mono- or bicyclic heterocycle, wherein the ring member atoms of said mono- or bicyclic heterocycle include besides carbon atoms further 1, 2, 3 or 4 heteroatoms selected from N, O and S as ring member atoms with the provision that the heterocycle cannot contain 2 contiguous atoms selected from O and S; and wherein the heteroaryl group in the group heteroaryl-$C_1$-$C_4$-alkyl is a 5- or 6-membered aromatic heterocycle, wherein the ring member atoms of the heterocyclic ring include besides carbon atoms 1, 2, 3 or 4 heteroatoms selected from N, O, and S as ring member atoms with the provision that the heterocycle cannot contain 2 contiguous atoms selected from O and S; and wherein any of the above-mentioned aliphatic or cyclic groups are unsubstituted or substituted with 1, 2, 3, or up to the maximum possible number of identical or different groups $R^{1a}$; or $R^1$ and $R^2$, together with the nitrogen atom to which they are attached, form a saturated or partially unsaturated mono- or bicyclic 3- to 10-membered heterocycle, wherein the heterocycle includes beside one nitrogen atom and one or more carbon atoms no further heteroatoms or 1, 2 or 3 further heteroatoms independently selected from N, O, and S as ring member atoms with the provision that the heterocycle cannot contain 2 contiguous atoms selected from O and S; and wherein the heterocycle is unsubstituted or substituted with 1, 2, 3, 4, or up to the maximum possible number of identical or different groups Ria; wherein $R^{1a}$ is halogen, oxo, cyano, $NO_2$, OH, SH, $NH_2$, $C_1$-$C_6$-alkyl, $C_1$-$C_6$-haloalkyl, $C_1$-$C_6$-alkoxy, $C_1$-$C_6$-haloalkoxy, $C_1$-$C_6$-alkylthio, $C_1$-$C_6$-haloalkylthio, $C_3$-$C_8$-cycloalkyl, —$NHSO_2$—$C_1$-$C_4$-alkyl, —(C=O)—$C_1$-$C_4$-alkyl, —C(=O)—O—$C_1$-$C_4$-alkyl, $C_1$-$C_6$-alkylsulfonyl, hydroxy$C_1$-$C_4$-alkyl, —C(=O)—$NH_2$, —C(=O)—NH($C_1$-$C_4$-alkyl), $C_1$-$C_4$-alkylthio-$C_1$-$C_4$-alkyl, amino$C_1$-$C_4$-alkyl, $C_1$-$C_4$-alkylamino-$C_1$-$C_4$-alkyl, di$C_1$-$C_4$-alkylamino-$C_1$-$C_4$-alkyl, aminocarbonyl-$C_1$-$C_4$-alkyl, or $C_1$-$C_4$-alkoxy-$C_1$-$C_4$-alkyl;

$R^2$ is hydrogen, $C_1$-$C_6$-alkyl, $C_2$-$C_6$-alkenyl, $C_2$-$C_6$-alkynyl, $C_1$-$C_6$-alkoxy, $C_3$-$C_{11}$-cycloalkyl, —C(=O)H, —C(=O)—$C_1$-$C_6$-alkyl, —C(=O)—$C_3$-$C_{11}$-cycloalkyl, or —C(=O)—O—$C_1$-$C_6$-alkyl; and wherein any of the aliphatic or cyclic groups in $R^2$ are unsubstituted or substituted with 1, 2, 3, or up to the maximum possible number of identical or different radicals selected from the group consisting of halogen, hydroxy, oxo, cyano, $C_1$-$C_6$-alkyl, $C_1$-$C_6$-alkoxy, and $C_3$-$C_{11}$-cycloalkyl;

to obtain a compound of formula VI

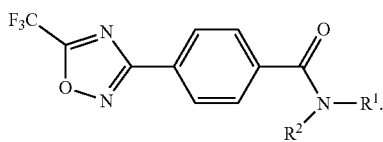

VI

These transformations are also described in WO 2013/008162, WO 2015/185485, WO 2017/211652, or WO 2019/020451, and in the references cited therein.

In another embodiment, the compound of formula VI is used to obtain a compound of formula VII

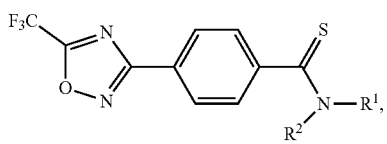

VII as described in WO 2019/020451 and WO 2017/211649 and in the references cited therein.

In a preferred embodiment the variables $R^1$ and $R^2$ in compounds of formula V, VI, and VII have the following meaning:

$R^1$ is methyl, ethyl, n-propyl, iso-propyl, n-butyl, sec-butyl, iso-butyl, cyclopropyl, 2-methoxyiminoethyl, bicyclo[1.1.1]pentan-1-yl, or phenyl; and wherein the phenyl group is unsubstituted or substituted with 1, 2, 3 or up to the maximum possible number of identical or different radicals selected from the group consisting of fluorine, chlorine, cyano, OH, $NH_2$, methyl, ethyl, methoxy, trifluoromethyl, trifluoromethoxy, difluoromethyl, difluoromethoxy, and cyclopropyl; and $R^2$ is hydrogen, methyl, or ethyl.

In another preferred embodiment the variables $R^1$ and $R^2$ in compounds of formula V, VI, and VII have the following meaning:

$R^1$ is methyl, 2-methoxyiminoethyl, bicyclo[1.1.1]pentan-1-yl, 2-fluoro-phenyl, 4-fluoro-phenyl, or 2,4-difluorophenyl; in particular methyl or 2-fluoro-phenyl; and $R^2$ is hydrogen.

In a preferred embodiment (embodiment E.1) of the present invention the aqueous medium in process steps i and ii has a pH value of 4 to 9.

Embodiment E.2: is based on embodiment E.1, wherein the terephthalonitrile II is added to the aqueous medium before incubation in a concentration between 1% and 30% by weight.

Embodiment E.3: is based on embodiment E.2, wherein the aqueous medium in step ii is incubated at a temperature in the range of from 10° C. to 50° C.

Embodiment E.4: is based on embodiment E.3, wherein 1 to 3 molar equivalents of hydroxylamine or a salt thereof are used in step iv, based on the amount of terephthalonitrile II.

Embodiment E.5: is based on embodiment E.4, wherein the temperature in step iv is in the range of from 0° C. and 100° C.

Embodiment E.6: is based on embodiment E.5, wherein no auxiliary base is added to the aqueous medium obtained in step iii so that the pH value of the aqueous medium in step iv of the process corresponds to the pH of the aqueous medium obtained after step iii.

Embodiment E.7: is based on embodiment E.6, wherein in compounds of formula V, VI and VII $R^1$ is methyl, ethyl, n-propyl, iso-propyl, n-butyl, sec-butyl, iso-butyl, cyclopropyl, 2-methoxyiminoethyl, bicyclo[1.1.1]pentan-1-yl, or phenyl; and wherein the phenyl group is unsubstituted or substituted with 1, 2, 3 or up to the maximum possible number of identical or different radicals selected from the group consisting of fluorine, chlorine, cyano, OH, $NH_2$, methyl, ethyl, methoxy, trifluoromethyl, trifluoromethoxy, difluoromethyl, difluoromethoxy, and cyclopropyl; and $R^2$ is hydrogen, methyl, or ethyl.

Embodiment E.8: is based on embodiment E.6, wherein in compounds of formula V, VI and VII $R^1$ is methyl, 2-methoxyiminoethyl, bicyclo[1.1.1]pentan-1-yl, 2-fluoro-phenyl, 4-fluoro-phenyl, or 2,4-difluorophenyl; in particular methyl or 2-fluoro-phenyl; and $R^2$ is hydrogen.

In the definitions of the variables given above, collective terms are used which are generally representative for the substituents in question.

The term "auxiliary base" in the context of the present invention refers to an inert organic or inorganic base acting as a proton scavenger. For the avoidance of doubt an auxiliary base in the context of this invention is not identical with the ammonia molecule formed during the course of the biocatalytic transformation and it is not identical with hydroxylamine or a salt thereof.

The term "$C_n$-$C_m$" indicates the number of carbon atoms possible in each case in the substituent or substituent moiety in question.

The term "halogen" refers to fluorine, chlorine, bromine and iodine.

The term "oxo" refers to an oxygen atom =O, which is bound to a carbon atom or sulfur atom, thus forming, for example, a ketonyl —C(=O)— or sulfinyl —S(=O)— group.

The term "$C_1$-$C_6$-alkyl" refers to a straight-chained or branched saturated hydrocarbon group having 1 to 6 carbon atoms, for example methyl, ethyl, propyl, 1-methylethyl, butyl, 1-methylpropyl, 2-methylpropyl, and 1,1-dimethylethyl.

The term "$C_2$-$C_6$-alkenyl" refers to a straight-chain or branched unsaturated hydrocarbon radical having 2 to 6 carbon atoms and a double bond in any position, such as ethenyl, 1-propenyl, 2-propenyl (allyl), 1-methylethenyl, 1-butenyl, 2-butenyl, 3-butenyl, 1-methyl-1-propenyl, 2-methyl-1-propenyl, 1-methyl-2-propenyl, 2-methyl-2-propenyl.

The term "$C_2$-$C_6$-alkynyl" refers to a straight-chain or branched unsaturated hydrocarbon radical having 2 to 6 carbon atoms and containing at least one triple bond, such as ethynyl, 1-propynyl, 2-propynyl (propargyl), 1-butynyl, 2-butynyl, 3-butynyl, 1-methyl-2-propynyl.

The term "$C_1$-$C_6$-haloalkyl" refers to a straight-chained or branched alkyl group having 1 to 6 carbon atoms (as defined above), wherein some or all of the hydrogen atoms in these groups may be replaced by halogen atoms as mentioned above, for example chloromethyl, bromomethyl, dichloromethyl, trichloromethyl, fluoromethyl, difluoromethyl, trifluoromethyl, chlorofluoromethyl, dichlorofluoromethyl, chlorodifluoromethyl, 1-chloroethyl, 1-bromoethyl, 1-fluoroethyl, 2-fluoroethyl, 2,2-difluoroethyl, 2,2,2-trifluoroethyl, 2-chloro-2-fluoroethyl, 2-chloro-2,2-difluoroethyl, 2,2-dichloro-2-fluoroethyl, 2,2,2-trichloroethyl and pentafluoroethyl, 2-fluoropropyl, 3-fluoropropyl, 2,2-difluoropropyl, 2,3-difluoropropyl, 2-chloropropyl, 3-chloropropyl, 2,3-dichloropropyl, 2-bromopropyl, 3-bromopropyl, 3,3,3-trifluoropropyl, 3,3,3-trichloropropyl, $CH_2$—$C_2F_5$, $CF_2$—$C_2F_5$, $CF(CF_3)_2$, 1-(fluoromethyl)-2-fluoroethyl, 1-(chloromethyl)-2-chloroethyl, 1-(bromomethyl)-2-bromoethyl, 4-fluorobutyl, 4-chlorobutyl, 4-bromobutyl or nonafluorobutyl.

The term "$C_1$-$C_6$-alkoxy" refers to a straight-chain or branched alkyl group having 1 to 6 carbon atoms (as defined above) which is bonded via an oxygen, at any position in the alkyl group, for example methoxy, ethoxy, n-propoxy, 1-methylethoxy, butoxy, 1-methylpropoxy, 2-methylpropoxy or 1,1-dimethylethoxy.

The term "$C_1$-$C_6$-haloalkoxy" refers to a $C_1$-$C_6$-alkoxy group as defined above, wherein some or all of the hydrogen atoms may be replaced by halogen atoms as mentioned above, for example, $OCH_2F$, $OCHF_2$, $OCF_3$, $OCH_2Cl$, $OCHCl_2$, $OCCl_3$, chlorofluoromethoxy, dichlorofluoromethoxy, chlorodifluoromethoxy, 2-fluoroethoxy, 2-chloroethoxy, 2-bromoethoxy, 2-iodoethoxy, 2,2-difluoroethoxy, 2,2,2-trifluoroethoxy, 2-chloro-2-fluoroethoxy, 2-chloro-2,2-difluoroethoxy, 2,2-dichloro-2-fluoroethoxy, 2,2,2-trichloroethoxy, $OC_2F_5$, 2-fluoropropoxy, 3-fluoropropoxy, 2,2-difluoropropoxy, 2,3-difluoropropoxy, 2-chloropropoxy, 3-chloropropoxy, 2,3-dichloropropoxy, 2-bromopropoxy, 3-bromopropoxy, 3,3,3-trifluoropropoxy, 3,3,3-trichloropropoxy, $OCH_2$—$C_2F_5$, $OCF_2$—$C_2F_5$, 1-($CH_2F$)-2-fluoroethoxy, 1-($CH_2Cl$)-2-chloroethoxy, 1-($CH_2Br$)-2-bromoethoxy, 4-fluorobutoxy, 4-chlorobutoxy, 4-bromobutoxy or nonafluorobutoxy.

The terms "phenyl-$C_1$-$C_4$-alkyl or heteroaryl-$C_1$-$C_4$-alkyl" refer to alkyl having 1 to 4 carbon atoms (as defined above), wherein one hydrogen atom of the alkyl radical is replaced by a phenyl or hetereoaryl radical respectively.

The term "$C_1$-$C_4$-alkoxy-$C_1$-$C_4$-alkyl" refers to alkyl having 1 to 4 carbon atoms (as defined above), wherein one hydrogen atom of the alkyl radical is replaced by a $C_1$-$C_4$-alkoxy group (as defined above). Likewise, the term "$C_1$-$C_4$-alkylthio-$C_1$-$C_4$-alkyl" refers to alkyl having 1 to 4 carbon atoms (as defined above), wherein one hydrogen atom of the alkyl radical is replaced by a $C_1$-$C_4$-alkylthio group.

The term "$C_1$-$C_6$-alkylthio" as used herein refers to straight-chain or branched alkyl groups having 1 to 6 carbon atoms (as defined above) bonded via a sulfur atom. Accordingly, the term "$C_1$-$C_6$-haloalkylthio" as used herein refers to straight-chain or branched haloalkyl group having 1 to 6 carbon atoms (as defined above) bonded through a sulfur atom, at any position in the haloalkyl group.

The term "$C_1$-$C_4$-alkoxyimino" refers to a divalent imino radical ($C_1$-$C_4$-alkyl-O—N=) carrying one $C_1$-$C_4$-alkoxy group as substituent, e.g. methylimino, ethylimino, propylimino, 1-methylethyl-imino, butylimino, 1-methylpropylimino, 2-methylpropylimino, 1,1-dimethylethylimino and the like.

The term "$C_1$-$C_6$-alkoxyimino-$C_1$-$C_4$-alkyl" refers to alkyl having 1 to 4 carbon atoms, wherein two hydrogen atoms of one carbon atom of the alkyl radical are replaced by a divalent $C_1$-$C_6$-alkoxyimino radical ($C_1$-$C_6$-alkyl-O—N=) as defined above.

The term "$C_2$-$C_6$-alkenyloxyimino-$C_1$-$C_4$-alkyl" refers to alkyl having 1 to 4 carbon atoms, wherein two hydrogen atoms of one carbon atom of the alkyl radical are replaced by a divalent $C_2$-$C_6$-alkenyloxyimino radical ($C_2$-$C_6$-alkenyl-O—N=).

The term "$C_2$-$C_6$-alkynyloxyimino-$C_1$-$C_4$-alkyl" refers to alkyl having 1 to 4 carbon atoms, wherein two hydrogen atoms of one carbon atom of the alkyl radical are replaced by a divalent $C_2$-$C_6$-alkynyloxyimino radical ($C_2$-$C_6$-alkynyl-O—N=).

The term "hydroxy$C_1$-$C_4$-alkyl" refers to alkyl having 1 to 4 carbon atoms, wherein one hydrogen atom of the alkyl radical is replaced by a OH group.

The term "amino$C_1$-$C_4$-alkyl" refers to alkyl having 1 to 4 carbon atoms, wherein one hydrogen atom of the alkyl radical is replaced by a $NH_2$ group.

The term "$C_1$-$C_6$-alkylamino" refers to an amino group, which is substituted with one residue independently selected from the group that is defined by the term $C_1$-$C_6$-alkyl. Likewise, the term "di$C_1$-$C_6$-alkylamino" refers to an amino group, which is substituted with two residues independently selected from the group that is defined by the term $C_1$-$C_6$-alkyl.

The term "$C_1$-$C_4$-alkylamino-$C_1$-$C_4$-alkyl" refers to refers to alkyl having 1 to 4 carbon atoms (as defined above), wherein one hydrogen atom of the alkyl radical is replaced by a $C_1$-$C_4$-alkyl-NH— group which is bound through the nitrogen. Likewise, the term "di$C_1$-$C_4$-alkylamino-$C_1$-$C_4$-alkyl" refers to refers to alkyl having 1 to 4 carbon atoms (as defined above), wherein one hydrogen atom of the alkyl radical is replaced by a ($C_1$-$C_4$-alkyl)$_2$N— group which is bound through the nitrogen.

The term "aminocarbonyl-$C_1$-$C_4$-alkyl" refers to alkyl having 1 to 4 carbon atoms, wherein one hydrogen atom of the alkyl radical is replaced by a —C(=O)—NH$_2$ group.

The term "$C_3$-$C_{11}$-cycloalkyl" refers to a monocyclic, bicyclic or tricyclic saturated univalent hydrocarbon radical having 3 to 11 carbon ring members that is connected through one of the ring carbon atoms by substitution of one hydrogen atom, such as cyclopropyl ($C_3H_5$), cyclobutyl, cyclopentyl, cyclohexyl, cycloheptyl, cyclooctyl, bicyclo[1.1.0]butyl, bicyclo[2.1.0]pentyl, bicyclo[1.1.1]pentyl, bicyclo[3.1.0]hexyl, bicyclo[2.1.1]hexyl, norcaranyl (bicyclo[4.1.0]heptyl) and norbornyl (bicyclo[2.2.1]heptyl).

The terms "—C(=O)—$C_1$-$C_6$-alkyl", "—C(=O)—O—$C_1$-$C_6$-alkyl" and "—C(=O)—$C_3$-$C_{11}$-cycloalkyl" refer to aliphatic radicals which are attached through the carbon atom of the —C(=O)— group or the oxygen atom of the "—C(=O)—O— group.

The term "aliphatic" refers to compounds or radicals composed of carbon and hydrogen and which are non-aromatic compounds. An "alicyclic" compound or radical is an organic compound that is both aliphatic and cyclic. They contain one or more all-carbon rings which may be either saturated or unsaturated, but do not have aromatic character.

The terms "cyclic moiety" or "cyclic group" refer to a radical which is an alicyclic ring or an aromatic ring, such as, for example, phenyl or heteroaryl.

The term "and wherein any of the aliphatic or cyclic groups are unsubstituted or substituted with . . . " refers to aliphatic groups, cyclic groups and groups, which contain an aliphatic and a cyclic moiety in one group, such as in, for example, $C_3$-$C_6$-cycloalkyl-$C_1$-$C_4$-alkyl; therefore a group which contains an aliphatic and a cyclic moiety both of these moieties may be substituted or unsubstituted independently of each other.

The term "phenyl" refers to an aromatic ring systems including six carbon atoms (commonly referred to as benzene ring.

The term "heteroaryl" refers to aromatic monocyclic or polycyclic ring systems including besides carbon atoms, 1, 2, 3 or 4 heteroatoms independently selected from the group consisting of N, O and S.

The term "saturated 3- to 7-membered carbocycle" is to be understood as meaning monocyclic saturated carbocycles having 3, 4 or 5 carbon ring members. Examples include cyclopropyl, cyclopentyl, cyclohexyl, cycloheptyl, and the like.

The term "3- to 10-membered saturated, partially unsaturated or aromatic mono- or bicyclic heterocycle, wherein the ring member atoms of said mono- or bicyclic heterocycle include besides carbon atoms further 1, 2, 3 or 4 heteroatoms selected from N, O and S as ring member atoms", is to be understood as meaning both, aromatic mono- and bicyclic heteroaromatic ring systems, and also saturated and partially unsaturated heterocycles, for example:

a 3- or 4-membered saturated heterocycle which contains 1 or 2 heteroatoms from the group consisting of N, O and S as ring members such as oxirane, aziridine, thiirane, oxetane, azetidine, thiethane, [1,2]dioxetane, [1,2]dithietane, [1,2]diazetidine;

and a 5- or 6-membered saturated or partially unsaturated heterocycle which contains 1, 2 or 3 heteroatoms from the group consisting of N, O and S as ring members such as 2-tetrahydro-furanyl, 3-tetrahydrofuranyl, 2-tetrahydrothienyl, 3-tetrahydrothienyl, 2-pyrrolidinyl, 3-pyrrolidinyl, 3-isoxazolidinyl, 4-isoxazolidinyl, 5-isoxazolidinyl, 3-isothiazolidinyl, 4-isothiazolidinyl, 5-isothiazolidinyl, 3-pyrazolidinyl, 4-pyrazolidinyl, 5-pyrazolidinyl, 2-oxazolidinyl, 4-oxazolidinyl, 5-oxazolidinyl, 2-thiazolidinyl, 4-thiazolidinyl, 5-thiazolidinyl, 2-imidazolidinyl, 4-imidazolidinyl, 1,2,4-oxadiazolidin-3-yl, 1,2,4-oxadiazolidin-5-yl, 1,2,4-thiadiazolidin-3-yl, 1,2,4-thiadiazolidin-5-yl, 1,2,4-triazolidin-3-yl, 1,3,4-oxadiazolidin-2-yl, 1,3,4-thiadiazolidin-2-yl, 1,3,4-triazolidin-2-yl, 2,3-dihydrofur-2-yl, 2,3-dihydrofur-3-yl, 2,4-dihydrofur-2-yl, 2,4-dihydrofur-3-yl, 2,3-dihydrothien-2-yl, 2,3-dihydrothien-3-yl, 2,4-dihydrothien-2-yl, 2,4-dihydrothien-3-yl, 2-pyrrolin-2-yl, 2-pyrrolin-3-yl, 3-pyrrolin-2-yl, 3-pyrrolin-3-yl, 2-isoxazolin-3-yl, 3-isoxazolin-3-yl, 4-isoxazolin-3-yl, 2-isoxazolin-4-yl, 3-isoxazolin-4-yl, 4-isoxazolin-4-yl, 2-isoxazolin-5-yl, 3-isoxazolin-5-yl, 4-isoxazolin-5-yl, 2-isothiazolin-3-yl, 3-isothiazolin-3-yl, 4-isothiazolin-3-yl, 2-isothiazolin-4-yl, 3-isothiazolin-4-yl, 4-isothiazolin-4-yl, 2-isothiazolin-5-yl, 3-isothiazolin-5-yl, 4-isothiazolin-5-yl, 2,3-dihydropyrazol-1-yl, 2,3-dihydropyrazol-2-yl, 2,3-dihydropyrazol-3-yl, 2,3-dihydropyrazol-4-yl, 2,3-dihydropyrazol-5-yl, 3,4-dihydropyrazol-1-yl, 3,4-dihydropyrazol-3-yl, 3,4-dihydropyrazol-4-yl, 3,4-dihydropyrazol-5-yl, 4,5-dihydropyrazol-1-yl, 4,5-dihydropyrazol-3-yl, 4,5-dihydropyrazol-4-yl, 4,5-dihydropyrazol-5-yl, 2,3-dihydrooxazol-2-yl, 2,3-dihydrooxazol-3-yl, 2,3-dihydrooxazol-4-yl, 2,3-dihydrooxazol-5-yl, 3,4-dihydrooxazol-2-yl, 3,4-dihydrooxazol-3-yl, 3,4-dihydrooxazol-4-yl, 3,4-dihydrooxazol-5-yl, 3,4-dihydrooxazol-2-yl, 3,4-dihydrooxazol-3-yl, 3,4-dihydrooxazol-4-yl, 2-piperidinyl, 3-piperidinyl, 4-piperidinyl, 1,3-dioxan-5-yl, 2-tetrahydropyranyl, 4-tetrahydropyranyl, 2-tetrahydrothienyl, 3-hexahydropyridazinyl, 4-hexahydropyridazinyl, 2-hexahydropyrimidinyl, 4-hexahydropyrimidinyl, 5-hexahydropyrimidinyl, 2-piperazinyl, 1,3,5-hexahydrotriazin-2-yl and 1,2,4-hexahydrotriazin-3-yl and also the corresponding -ylidene radicals; and a 7-membered saturated or partially unsaturated heterocycle such as tetra- and hexahydroazepinyl, such as 2,3,4,5-tetrahydro[1H]azepin-1-,-2-,-3-,-4-,-5-,-6- or -7-yl, 3,4,5,6-tetrahydro[2H]azepin-2-,-3-,-4-,-5-,-6- or -7-yl, 2,3,4,7-tetrahydro[1H]azepin-1-,-2-,-3-,-4-,-5-,-6- or -7-yl, 2,3,6,7-tetrahydro[1H]azepin-1-,-2-,-3-,-4-,-5-,-6- or -7-yl, hexahydroazepin-1-,-2-,-3- or -4-yl, tetra- and hexahydrooxepinyl such as 2,3,4,5-tetrahydro[1H]oxepin-2-,-3-,-4-,-5-,-6- or -7-yl, 2,3,4,7-tetrahydro[1H]oxepin-2-,-3-,-4-,-5-,-6- or -7-yl, 2,3,6,7-tetrahydro[1H]oxepin-2-,-3-,-4-,-5-,-6- or -7-yl, hexahydroazepin-1-,-2-,-3- or -4-yl, tetra- and hexahydro-1,3-diazepinyl, tetra- and hexahydro-1,4-diazepinyl, tetra- and hexahydro-1,3-oxazepinyl, tetra- and hexahydro-1,4-oxazepinyl, tetra- and hexahydro-1,3-dioxepinyl, tetra- and hexahydro-1,4-dioxepinyl and the corresponding -ylidene radicals.

The term "5- or 6-membered heteroaryl" or the term "5- or 6-membered aromatic heterocycle" refer to aromatic ring systems including besides carbon atoms, 1, 2, 3 or 4 heteroatoms independently selected from the group consisting of N, O and S, for example, a 5-membered heteroaryl such as pyrrol-1-yl, pyrrol-2-yl, pyrrol-3-yl, thien-2-yl, thien-3-yl, furan-2-yl, furan-3-yl, pyrazol-1-yl, pyrazol-3-yl, pyrazol-4-yl, pyrazol-5-yl, imidazol-1-yl, imidazol-2-yl, imidazol-4-yl, imidazol-5-yl, oxazol-2-yl, oxazol-4-yl, oxazol-5-yl, isoxazol-3-yl, isoxazol-4-yl, isoxazol-5-yl, thiazol-2-yl, thiazol-4-yl, thiazol-5-yl, isothiazol-3-yl, isothiazol-4-yl, isothiazol-5-yl, 1,2,4-triazolyl-1-yl, 1,2,4-triazol-3-yl 1,2,4- triazol-5-yl, 1,2,4-oxadiazol-3-yl, 1,2,4-oxadiazol-5-yl and 1,2,4-thiadiazol-3-yl, 1,2,4-thiadiazol-5-yl; or a 6-membered heteroaryl, such as pyridin-2-yl, pyridin-3-yl, pyridin-4-yl, pyridazin-3-yl, pyridazin-4-yl, pyrimidin-2-yl, pyrimidin-4-yl, pyrimidin-5-yl, pyrazin-2-yl and 1,3,5-triazin-2-yl and 1,2,4-triazin-3-yl.

WORKING EXAMPLES

The present invention is further illustrated by means of the following working example:

Example 1) Preparation of 4-(N'-hydroxycarbamimidoyl)benzoic acid

Terephthalonitrile (108.9 g, 0.85 mol) and water (881 g) were placed in a glass reactor at 25° C. and heated to 30° C. The biocatalyst suspension in 50 mM potassium phosphate buffer @ pH 7 (10 g, *Escherichia coli* TG10+ pDHE-Com expressing a nitrilase from *Comamonas testosteroni*) was added once the temperature reached 30° C. The mixture was stirred using a three-stage cross-arm stirrer for 23 hours. Completion of reaction was indicated by absence of residual solid terephthalonitrile (visual test). A 50 wt-% NaOH solution in water (10 g) was added after the reaction to adjust the pH to 8.73. Mixing was continued for 30 minutes. The suspension was filtered via a 0.22 μm single use filter to remove the biocatalyst. The clear filtrate of the 4-cyanobenzoic acid ammonium salt was used without further purification in the next step. The aqueous filtrate solution of the 4-cyanobenzoic acid salt (516 g, 0.43 mol, 500.05 mL–c=0.85 mol/L–ρ=1.03 kg/L) was placed in a glass reactor and hydroxylamine (37.9 g, 0.57 mol, 1.35 eq, 50% solution in water) was added over a period of 5 min (slightly exothermic, T~29.5° C.). The resulting solution was warmed to 40° C. and stirred for 6 hours. The solution was then cooled to 25° C. and the pH of the solution is then adjusted to 4.4 by using an aqueous HCl solution (63.4 g, 0.64 mol, 37 wt-% in water). Water (20 g) was added to ensure proper stirring of the suspension. The mixture was then cooled to 5° C. and filtrated (nutsch). Solids were washed with pre-cooled water (110 mL at 5° C.) and dried under reduced pressure at 50° C. to afford the desired product (74.5 g, 94.7%, purity 97.4%).

Example 2

Terephthalonitrile (89 g, 0.695 mol) and water (900 g) were placed in a glass reactor at 25° C. and heated to 30° C. Biocatalyst suspension in 50 mM potassium phosphate buffer pH 7 (11 g, *Escherichia coli* TG10+ pDHE-Com expressing a nitrilase from *Comamonas testosteroni*) was added once the temperature reached 30° C. The mixture was stirred using a three stage cross-arm stirrer for 23 hours. Completion of reaction was indicated by absence of residual solid terephthalonitrile (visual test). After the bioconversion, the reaction suspension was removed from the reactor and filtered through Celite535 to remove the bulk quantity of biocatalyst. Subsequently the material was filtered via a 0.22 μm single use filter to remove residual biocatalyst. The clear filtrate contained the 4-cyanobenzoic acid ammonium salt in a concentration translating into 8.82 wt-% 4-cyanobenzoic acid and was used without further purification in the next step.

A part of the aqueous filtrate solution of the 4-cyanobenzoic acid salt (130 g, 8.82 wt-%, 77.9 mmol) was placed in a glass reactor and hydroxylamine (8 g, 121.1 mmol, 1.55 eq, 50% solution in water) was added over a period of 20 min at 50° C. The resulting mixture was stirred for 4 hours at unchanged temperature. The solution was then cooled to 21° C. and the pH of the solution was adjusted to <3 by addition of a 50% sulfuric acid solution (13 g, 66 mmol, 50 wt-% in water) in order to precipitate the product. The resulting suspension was then cooled to 5° C. and filtrated. Solids were washed twice with pre-cooled water (50 mL each portion, at 5° C.) and dried under reduced pressure (70° C./25 mbar) over 12 hours to afford the desired product (14.1 g, yield 94.2% of theory, purity 93.8% determined by quant. NMR).

The nitrilase from *Comamonas testosteroni* that was used in examples 1 and 2 above was retrieved from a sequence from a publicly accessible database (its primary structure/sequence is deposited in GenBank on 29 Nov. 1995 under the accession number L32589.1 (Nucleotide) and AAA82085.1 (Aminoacid)) and corresponds to Seq. ID 2, SEQ amino acid 29, SEQ ID nucleic acid 28, Identity 90% in table 1 of PCT/EP2020/051288. *Comamonas testosteroni* is a ubiquitous soil bacterium that has been sampled prior to August 1990 without any known Nagoya Protocol obligations (DSMZ entry DSM 38, Country of origin unknown).

The invention claimed is:
1. A process for preparing amidoxime compounds of formula I,

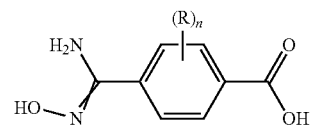

wherein
R is halogen, $C_1$-$C_4$-alkyl, $C_1$-$C_4$-haloalkyl, $C_1$-$C_4$-alkoxy, or $C_1$-$C_4$-haloalkoxy;
n is 0, 1 or 2;
the process comprising
i. providing an aqueous medium comprising water, one or more nitrilase, and a terephthalonitrile of formula II, wherein the variables n and R have the meaning as defined for compound of formula I;

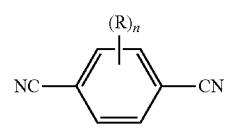

ii. incubating the aqueous medium to obtain 4-cyanobenzoic acid of formula IIa or a salt thereof in an aqueous medium, wherein the variables n and R in 4-cyanobenzoic acid IIa have the meaning as defined for compound of formula 1;

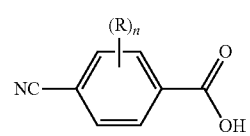

iii. removal of biological material from the aqueous medium;

iv. treatment of the aqueous medium obtained in step iii with hydroxylamine or a salt thereof.

2. The process according to claim 1, wherein n is 0 in compounds of formulae I, II, and IIa.

3. The process according to claim 1, wherein the terephthalonitrile II is added to the aqueous medium before incubation in a concentration between 1% and 30% by weight.

4. The process according to claim 1, wherein the aqueous medium in process steps i and ii has a pH value of 4 to 9.

5. The process according to claim 1, wherein the aqueous medium in step ii is incubated at a temperature in the range of from 10° C. to 50° C.

6. The process according to claim 1, wherein 1 to 3 molar equivalents of hydroxylamine or a salt thereof are used in step iv, based on the amount of terephthalonitrile II.

7. The process according to claim 1, wherein the temperature in step iv is in a range of from 0° C. and 100° C.

8. The process according to claim 1, wherein the compound of formula I is isolated by filtration or centrifugation after step iv.

9. The process according to claim 2, further comprising reacting the compound of formula I to obtain a compound of formula III

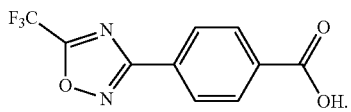

III

10. The process according to claim 9, further comprising reacting the compound of formula III to obtain a compound of formula IV

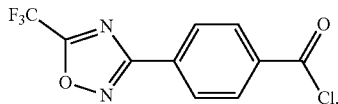

IV

11. The process according to claim 10, further comprising reacting the compound of formula III or IV with a compound of formula V,

V wherein

R$^1$ is C$_1$-C$_6$-alkyl, C$_1$-C$_6$-alkoxy, C$_3$-C$_{11}$-cycloalkyl, C$_3$-C$_8$-cycloalkenyl, C$_2$-C$_6$-alk-enyl, C$_2$-C$_6$-alkynyl, C$_1$-C$_6$-alkoxyimino-C$_1$-C$_4$-alkyl, C$_2$-C$_6$-alkenyloxyimino-C$_1$-C$_4$-alkyl, C$_2$-C$_6$-alkynyloxyimino-C$_1$-C$_4$-alkyl, C$_1$-C$_6$-alkylamino, diC$_1$-C$_6$-alkylamino, —C(=O)—C$_1$-C$_6$-alkyl, —C(=O)—O—C$_1$-C$_6$-alkyl, phenyl-C$_1$-C$_4$-alkyl, phenyl-C$_2$-C$_4$-alkenyl, phenyl-C$_2$-C$_4$-alkynyl, heteroaryl-C$_1$-C$_4$-alkyl, phenyl, naphthyl, or a 3- to 10-membered saturated, partially unsaturated or aromatic mono- or bicyclic heterocycle, wherein the ring member atoms of said mono- or bicyclic heterocycle contain besides carbon atoms further 1, 2, 3, or 4 heteroatoms selected from N, O, and S as ring member atoms with the provision that the heterocycle cannot contain 2 contiguous atoms selected from O and S; and wherein the heteroaryl group in the group heteroaryl-C$_1$-C$_4$-alkyl is a 5- or 6-membered aromatic heterocycle, wherein the ring member atoms of the heterocyclic ring contain besides carbon atoms 1, 2, 3, or 4 heteroatoms selected from N, O, and S as ring member atoms with the provision that the heterocycle cannot contain 2 contiguous atoms selected from O and S; and wherein any of the above-mentioned aliphatic or cyclic groups are unsubstituted or substituted with 1, 2, 3, or up to the maximum possible number of identical or different groups R$^{1a}$; or R$^1$ and R$^2$, together with the nitrogen atom to which they are attached, form a saturated or partially unsaturated mono- or bicyclic 3- to 10-membered heterocycle, wherein the heterocycle contains beside one nitrogen atom and one or more carbon atoms no further heteroatoms or 1, 2 or 3 further heteroatoms independently selected from N, O, and S as ring member atoms with the provision that the heterocycle cannot contain 2 contiguous atoms selected from O and S; and wherein the heterocycle is unsubstituted or substituted with 1, 2, 3, 4, or up to the maximum possible number of identical or different groups R$^{1a}$; wherein R$^{1a}$ is halogen, oxo, cyano, NO$_2$, OH, SH, NH$_2$, C$_1$-C$_6$-alkyl, C$_1$-C$_6$-haloalkyl, C$_1$-C$_6$-alkoxy, C$_1$-C$_6$-haloalkoxy, C$_1$-C$_6$-alkylthio, C$_1$-C$_6$-haloalkylthio, C$_3$-C$_8$-cycloalkyl, —NHSO$_2$—C$_1$-C$_4$-alkyl, —(C=O)—C$_1$-C$_4$-alkyl, —C(=O)—O—C$_1$-C$_4$-alkyl, C$_1$-C$_6$-alkylsulfonyl, hydroxyC$_1$-C$_4$-alkyl, —C(=O)—NH$_2$, —C(=O)—NH(C$_1$-C$_4$-alkyl), C$_1$-C$_4$-alkylthio-C$_1$-C$_4$-alkyl, aminoC$_1$-C$_4$-alkyl, C$_1$-C$_4$-alkylamino-C$_1$-C$_4$-alkyl, diC$_1$-C$_4$-alkylamino-C$_1$-C$_4$-alkyl, aminocarbonyl-C$_1$-C$_4$-alkyl, or C$_1$-C$_4$-alkoxy-C$_1$-C$_4$-alkyl;

R$^2$ is hydrogen, C$_1$-C$_6$-alkyl, C$_2$-C$_6$-alkenyl, C$_2$-C$_6$-alkynyl, C$_1$-C$_6$-alkoxy, C$_3$-C$_{11}$-cycloalkyl, —C(=O) H, —C(=O)—C$_1$-C$_6$-alkyl, —C(=O)—C$_3$-C$_{11}$-cycloalkyl, or —C(=O)—O—C$_1$-C$_6$-alkyl; and wherein any of the aliphatic or cyclic groups in R$^2$ are unsubstituted or substituted with 1, 2, 3, or up to the maximum possible number of identical or different radicals selected from the group consisting of halogen, hydroxy, oxo, cyano, C$_1$-C$_6$-alkyl, C$_1$-C$_6$-alkoxy, and C$_3$-C$_{11}$-cycloalkyl;

to obtain a compound of formula VI

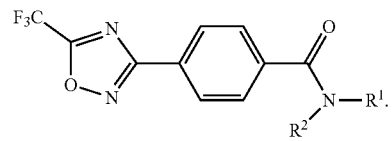

VI

12. The process according to claim 11, further comprising reacting the compound of formula VI to obtain a compound of formula VII

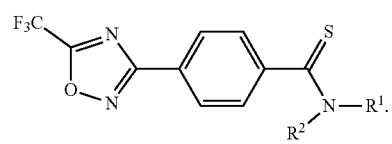

VII

13. The process according to claim 12, wherein in compounds of formula V, VI and VII $R^1$ is methyl, ethyl, n-propyl, iso-propyl, n-butyl, sec-butyl, iso-butyl, cyclopropyl, 2-methoxyiminoethyl, bicyclo[1.1.1]pentan-1-yl, or phenyl; and wherein the phenyl group is unsubstituted or substituted with 1, 2, 3 or up to the maximum possible number of identical or different radicals selected from the group consisting of fluorine, chlorine, cyano, OH, $NH_2$, methyl, ethyl, methoxy, trifluoromethyl, trifluoromethoxy, difluoromethyl, difluoromethoxy, and cyclopropyl; and $R^2$ is hydrogen, methyl, or ethyl.

14. The process according to claim 12, wherein in compounds of formula V, VI and VII $R^1$ is methyl, 2-methoxyiminoethyl, bicyclo[1.1.1]pentan-1-yl, 2-fluoro-phenyl, 4-fluoro-phenyl, or 2,4-difluorophenyl; and $R^2$ is hydrogen.

\* \* \* \* \*